(12) United States Patent
Gray

(10) Patent No.: US 9,410,569 B2
(45) Date of Patent: Aug. 9, 2016

(54) REMOVABLE PANEL FASTENER

(71) Applicant: Richard W. Gray, Moorpark, CA (US)

(72) Inventor: Richard W. Gray, Moorpark, CA (US)

( * ) Notice: Subject to any disclaimer, the term of this patent is extended or adjusted under 35 U.S.C. 154(b) by 212 days.

(21) Appl. No.: 14/154,742

(22) Filed: Jan. 14, 2014

(65) Prior Publication Data

US 2014/0223717 A1    Aug. 14, 2014

Related U.S. Application Data

(60) Provisional application No. 61/764,912, filed on Feb. 14, 2013.

(51) Int. Cl.
| *F16B 19/04* | (2006.01) |
| *F16B 21/12* | (2006.01) |
| *F16B 5/06* | (2006.01) |

(52) U.S. Cl.
CPC .............. *F16B 21/125* (2013.01); *F16B 5/0642* (2013.01); *Y10T 29/49815* (2015.01); *Y10T 29/49947* (2015.01)

(58) Field of Classification Search
CPC ...... F16B 21/125; F16B 5/0642; F16B 21/09; F16B 21/20; F16B 21/16
USPC ......... 411/511, 342, 344, 347, 348, 345, 549; 411/500; 292/147, 152, 153, 323; 403/319, 403/321, 322.1, 325; 70/33, 34, 173, 345, 70/368, 387, 388
See application file for complete search history.

(56) References Cited

U.S. PATENT DOCUMENTS

| 2,310,756 | A | * | 2/1943 | Tinnerman | B25B 27/20 411/525 |
| 2,352,392 | A | * | 6/1944 | Kost | F16B 21/09 24/704.1 |
| 2,945,712 | A | * | 7/1960 | Lewis | F16B 2/241 29/453 |
| 3,186,196 | A | * | 6/1965 | Moberg | E05B 67/365 292/252 |
| 3,390,712 | A | * | 7/1968 | McKay | F16B 39/04 24/453 |
| 4,287,644 | A | | 9/1981 | Durand | |
| 4,297,063 | A | * | 10/1981 | Hart | F16B 41/002 411/199 |
| 4,728,238 | A | | 3/1988 | Chisholm et al. | |
| 4,861,208 | A | | 8/1989 | Boundy | |
| 4,919,373 | A | | 4/1990 | Caveney et al. | |
| 5,117,745 | A | | 6/1992 | Prochnow et al. | |
| 5,339,501 | A | | 8/1994 | Gugle et al. | |
| 5,366,332 | A | * | 11/1994 | Murphy | F16B 5/0642 411/342 |
| 5,682,775 | A | * | 11/1997 | Baber | E05B 65/0864 70/34 |
| 5,713,224 | A | * | 2/1998 | Liou | E05B 15/101 70/128 |
| 5,797,714 | A | | 8/1998 | Oddenino | |

(Continued)

*Primary Examiner* — Gary Estremsky
(74) *Attorney, Agent, or Firm* — SoCal IP Law Group LLP; John E. Gunther; Steven C. Sereboff

(57) ABSTRACT

There is disclosed a panel fastener and method of attaching multiple panels. A panel fastener may include a pin and a receptacle, the pin having a head and a shank extending from the head and the receptacle having an aperture to receive the shank and a retainer configured to engage the shank to prevent the shank from being withdrawn from the aperture. The head and the receptacle may have respective openings to receive a key to disengage the retainer from the shank.

17 Claims, 7 Drawing Sheets

(56) References Cited

U.S. PATENT DOCUMENTS

| | | | |
|---|---|---|---|
| 6,453,706 B1 * | 9/2002 | Chen | E05B 67/36 70/226 |
| 6,454,507 B1 * | 9/2002 | Romero Magarino | B60R 13/0206 411/339 |
| 6,676,177 B2 | 1/2004 | Daoud et al. | |
| 6,715,185 B2 | 4/2004 | Angellotti | |
| 7,207,759 B2 | 4/2007 | Kato | |
| 7,698,815 B2 * | 4/2010 | Garner | H01L 23/4093 29/890.032 |
| 7,740,432 B2 | 6/2010 | Harada | |
| 7,784,159 B2 | 8/2010 | Dickinson et al. | |
| 2007/0193392 A1 * | 8/2007 | Hurwic | B60T 11/18 74/512 |
| 2009/0249923 A1 | 10/2009 | Seidel | |

\* cited by examiner

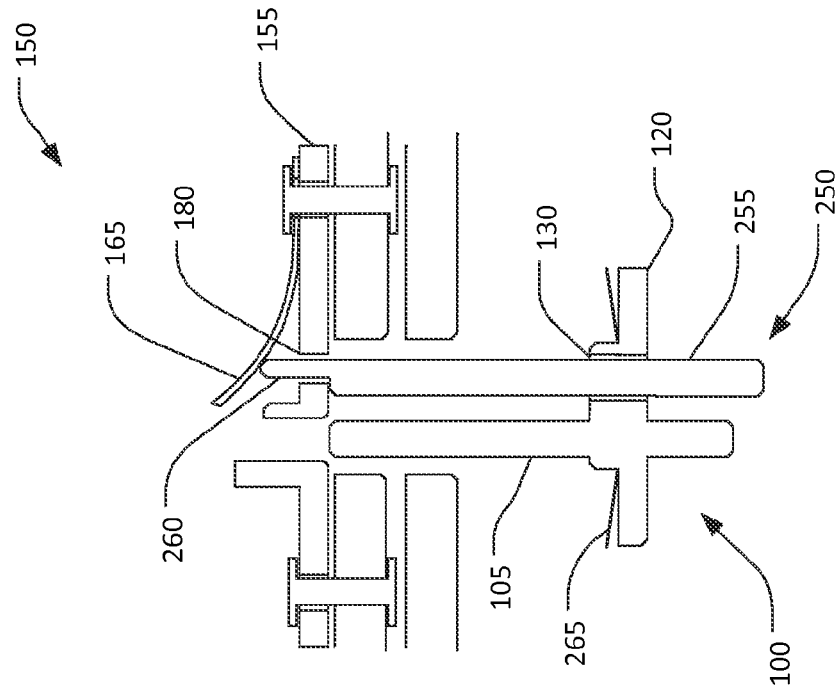
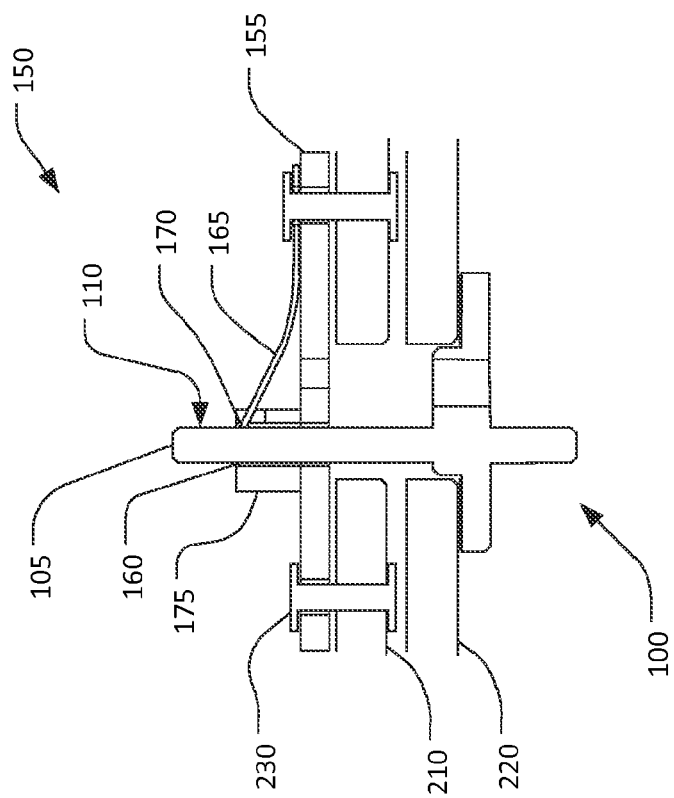
FIG. 2B
FIG. 2A

REMOVABLE PANEL FASTENER

RELATED APPLICATION INFORMATION

This patent claims priority from provisional patent application No. 61/764,912, filed Feb. 14, 2013, entitled REMOVABLE PANEL FASTENER.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This patent relates to fasteners used to attach panels to each other and to structural elements.

2. Description of the Related Art

Panel fasteners are used to attach panels to underlying structural elements. Panel fasteners may be used to attach aircraft cowlings, race car body parts, and equipment access panels. The currently popular fasteners, including Dzeus and Camloc®, have a limited grip range and require precise alignment of the parts to be connected.

DESCRIPTION OF THE DRAWINGS

FIG. 2A is a cross-sectional view showing the pin of FIG. 1A engaged with the receptacle of FIG. 1B.

FIG. 2B is a cross-sectional view showing the pin of FIG. 1A being removed from the receptacle of FIG. 1B.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figures 1A, 1B:
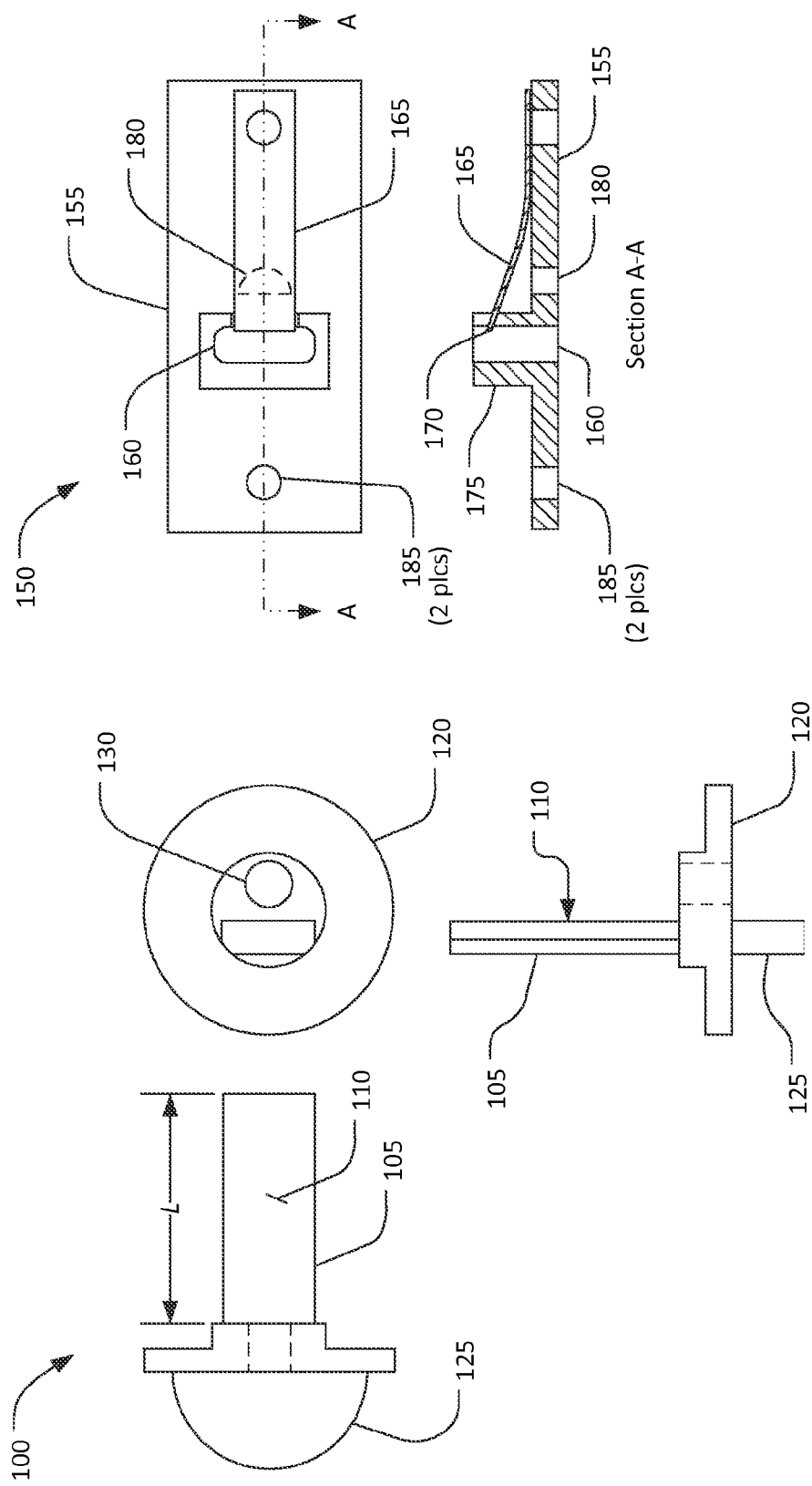
FIG. 1A provides three plan views of a pin.
FIG. 1B provides a plan view and a cross-sectional view of a receptacle.

FIGS. 1A, 1B, 2A, and 2B show a removable panel fastener. Specifically, FIG. 1A shows three plan views of a pin 100, and FIG. 1B shows a plan view and a cross-sectional view of a receptacle 150. FIG. 2A is a cross-section view (with section lines omitted) of the pin 100 engaged with the receptacle 150 to fasten first and second panels 210, 220. Either of the first and second panels 210, 220, may be a frame member or structural element rather than a panel. FIG. 2B is a cross section view at an instant in time when a key 250 is used to disengage the pin 100 from the receptacle 150.

Referring now to FIG. 1A, the pin 100 may include an elongate shank 105 extending from a head 120. The shank 105 may have a flat surface 110. An optional handle 125 may extend from a surface of the head 120 opposed to the shank 105. The head 120 may have a through opening 130 proximate to the shank 105. The circular shape of the head 120, the semicircular shape of the handle 125, and the cross-sectional shape of the shank 105 are exemplary. The shank 105, the head 120, and the handle 125 may be shaped differently. A length L of the shank 105 may be configured to fasten two or more panels of predetermined thickness. Specifically, the length L may be sufficient to extend through the two or more panels to be joined into the receptacle 150.

Referring now to FIG. 1B, the receptacle 150 may include a base 155 having an aperture 160 to receive the shank of a pin such as the pin 100. The receptacle may include a retainer 165 configured to engage a pin inserted into the aperture 160. An edge 170 of the retainer 165 may extend into the aperture. The retainer 165 may be a flat spring as shown, or may have some other structure. An abutment 175 may extend from the base 155 on an opposite side of the aperture 160 from the retainer 165. The abutment 175 may be configured to prevent a pin inserted into the aperture 160 from flexing away from the retainer 165. The base 155 may have a through keyhole 180 proximate the retainer 165. The keyhole 180 may be disposed such that a stem inserted through the keyhole 180 may be used to urge the retainer 165 away from the aperture 160 and to thereby cause the retainer 165 to disengage an inserted shank. The base 155 may have one or more mounting holes 185 to allow the base 155 to be attached to a panel.

Referring now to FIG. 2A, a pin 100 and a receptacle 150 may be used to fasten a first panel 210 and a second panel 220. The base 155 of the receptacle 150 may be attached to the first panel 210 using rivets 230 (as shown), screws, spot welds, adhesive bonding, or some other method. The shank 105 of the pin 100 may be inserted through respective holes in the second panel 220 and the first panel 210 and into the aperture 160 of the receptacle 150. A retainer 165 of the receptacle 150 may engage the shank 105 to prevent the pin from being withdrawn from the aperture 160. An abutment 175 extending from the base 155 may prevent the shank 105 from flexing away from the retainer 165.

The edge 170 of the retainer 165 may contact a flat surface 110 of the shank 105. The edge 170 may contact the flat surface 110 with sufficient force to elastically deform the flat surface 110 to create traction to retain the shank 105. For example, the retainer 165 may be made from a metal spring material and the shank 105 may be made from a material, such as a plastic material, that is softer than the retainer 165. The material of the shank 105 may be sufficiently soft (compared to the metal spring material) to allow the edge 170 of the retainer 165 to embed slightly into the flat surface 110 to prevent the shank 105 from being withdrawn from the receptacle 150.

Referring now to FIG. 2B, a key 250 may be inserted through the hole 130 in the head 120 of the pin 100. A shaft 255 of the key 250 may pass though the second panel 220 and the first panel 210. A stem 260 extending from the shaft 255 may pass through the keyhole 180 in the base 155 of the receptacle 150. Pressure on the key 250 may cause the retainer 165 to move away from the shank 105 and thus allow the pin 100 to be withdrawn from the receptacle 150. A cross-sectional shape of the stem 260 may be smaller than a cross-sectional shape of the shaft 255. The cross-sectional shape of the shaft 255 may prevent the shaft 255 from passing though the keyhole 180, preventing over-insertion of the key 250.

To prevent or discourage tampering, stem 260 of the key 250 may have an irregular cross-sectional shape and the keyhole 180 may have a corresponding shape. For example, the stem 260 and keyhole 180 may have a semicircular (as shown in FIG. 1B), triangular, or other irregular cross-sectional shape.

Withdrawal of the pin 100 may be facilitated by placing an ejector spring 265 between the head 120 of the pin 100 and the second panel 220. The ejector spring 265 may be, for example, a bevel washer or coil spring. The ejector spring 265 may be attached to the head 120. The ejector spring 265 may be configured to provide a compressive force to prevent movement of joined panels.

Figures 3A, 3B:
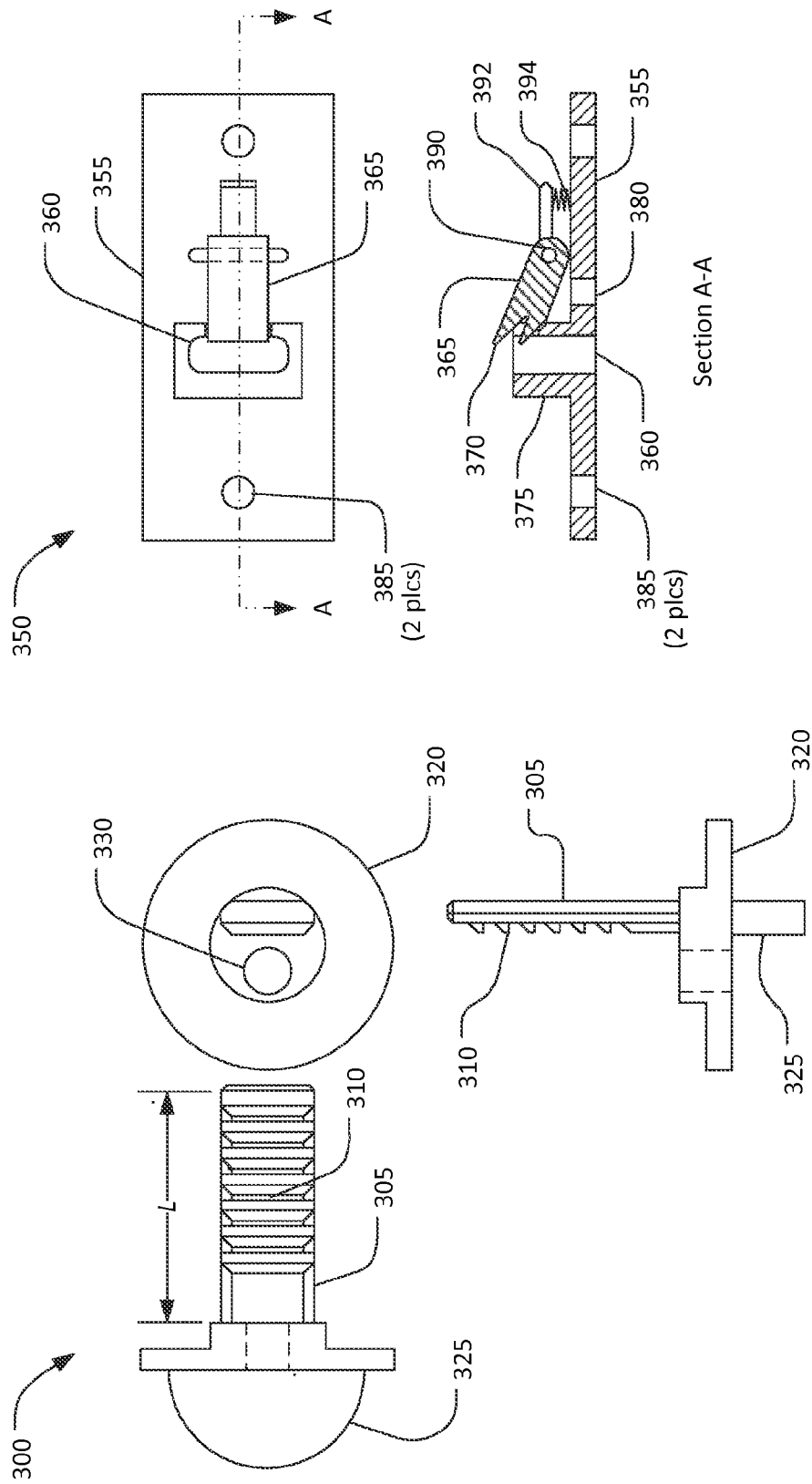
FIG. 3A provides three plan views of another pin.
FIG. 3B provides a plan view and a cross-sectional view of another receptacle.
Figure 4:
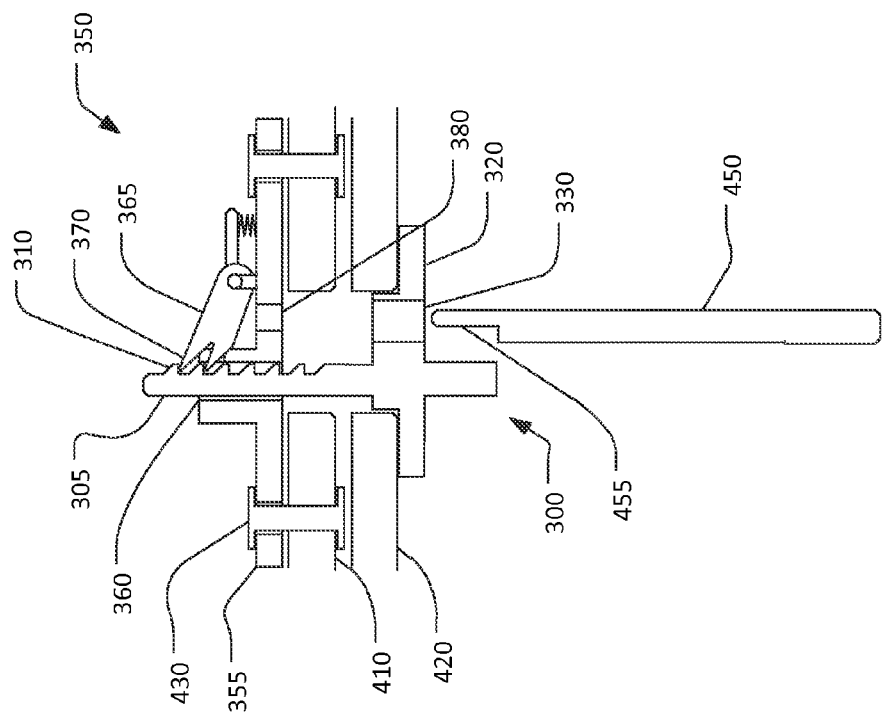
FIG. 4 is a cross-sectional view showing the pin of FIG. 3A engaged with the receptacle of FIG. 3B.

FIGS. 3A, 3B, and 4 show another removable panel fastener. Specifically, FIG. 3A shows three plan views of a pin 300, and FIG. 3B shows a plan view and a cross-sectional view of a receptacle 350. FIG. 4 is a cross-section view (with section lines omitted) of the pin 300 engaged with the receptacle 350 to fasten first and second panels 410, 400.

Referring now to FIG. 3A, the pin 300 may include an elongate shank 305 extending from a head 320. At least one side of the shank 305 may have a plurality of teeth 310. An optional handle 325 may extend from a surface of the head 320 opposed to the shank 305. The head 320 may have a through opening 330 proximate to the shank 305. The circular shape of the head 320, the semicircular shape of the handle 325, and the cross-sectional shape of the shank 305 are exemplary. The shank 305, the head 320, and the handle 325 may be shaped differently. A length L of the shank 305 may be configured to fasten two or more panels of predetermined thickness. Specifically, the length L may be sufficient to extend through the two or more panels to be joined into the receptacle 350.

Referring now to FIG. 3B, the receptacle 350 may include a base 355 having an aperture 360 to receive the shank of a pin such as the pin 300. The receptacle may include a retainer 365 configured to engage a pin inserted into the aperture 360. The retainer 365 may be a pivoting pawl. One or more teeth 370 of the retainer 365 may extend over the aperture 360. A spring 394 operating against a lever arm 392 may urge the retainer 365 to rotate towards the aperture 360. The retainer 365 may be spring loaded in some other manner.

An abutment 375 may extend from the base 355 on an opposite side of the aperture 360 from the retainer 365. The abutment 375 may be configured to prevent a pin inserted into the aperture 360 from flexing away from the retainer 365. The base 355 may have a through keyhole 380 proximate the retainer 365. The keyhole 380 may be disposed such that a stem inserted through the keyhole 380 may be used to urge the retainer 365 to rotate away from the aperture 360 and to thereby cause the retainer 365 to disengage an inserted shank. The base 355 may have one or more mounting holes 385 to allow the base 355 to be attached to a panel.

Referring now to FIG. 4, the pin 300 and the receptacle 350 may be used to fasten a first panel 410 and a second panel 420. The base 355 of the receptacle 350 may be attached to the first panel 410 using rivets 430 (as shown), screws, spot welds, adhesive bonding, or some other method. The shank 305 of the pin 300 may be inserted through respective holes in the second panel 420 and the first panel 410 and into the aperture 360 of the receptacle 350. One or more teeth 370 of the retainer 365 may engage one or more teeth 310 on the shank 305 to prevent the pin from being withdrawn from the aperture 360.

A key 450 may be configured to be inserted through the opening 330 in the head 320 of the pin 300. The key 450 may be configured to pass though the second panel 420 and the first panel 410. A stem 455 of the key 450 may pass be configured to pass through the keyhole 380 in the base 355 of the receptacle 350. Pressure on the key 450 may cause the retainer 365 to move away from the shank 305 (not illustrated) and thus allow the pin 300 to be withdrawn from the receptacle 350.

To prevent or discourage tampering, stem 455 of the key 450 may have an irregular cross-sectional shape and the keyhole 380 may have a corresponding shape. Withdrawal of the pin 300 may be facilitated by placing an ejector spring (not shown) between the head 320 of the pin 300 and the second panel 420.

Figure 5:
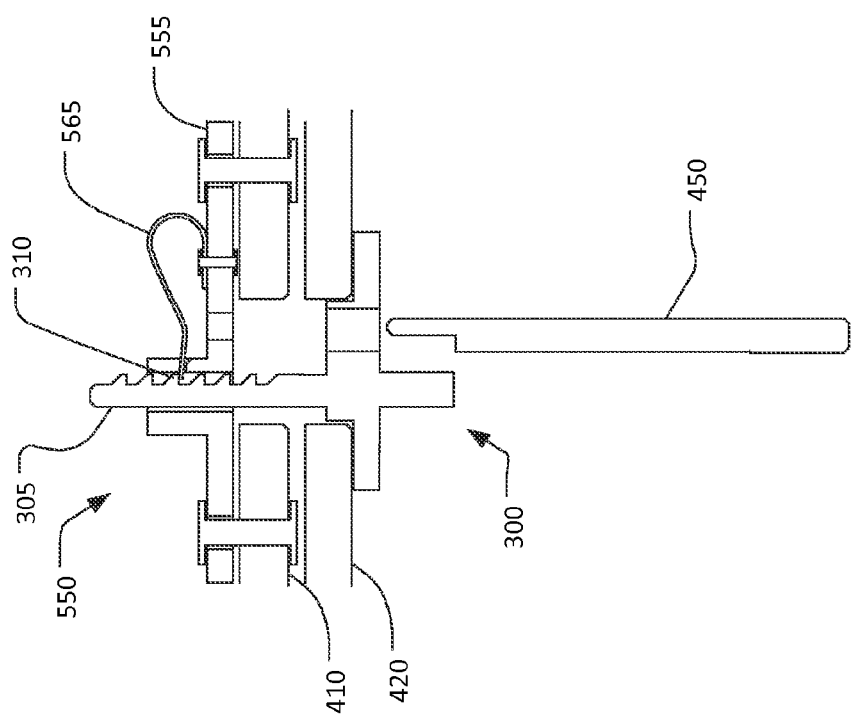
FIG. 5 is a cross-sectional view showing the pin of FIG. 3A engaged with another receptacle.

FIG. 5 is a cross-section view (with section lines omitted) of the pin 300 engaged with another receptacle 550 to fasten first and second panels 410, 400. The receptacle 550 may be similar to the receptacle 350 of FIGS. 3B and 4, except that the receptacle 550 may include a retainer 565 in the form of a flat spring. The retainer 565 may engage a single tooth 310 on the shank 305 of the pin 300. A key 450 may be configured to disengage the retainer 565 to allow the pin 300 to be withdrawn.

Figure 6:
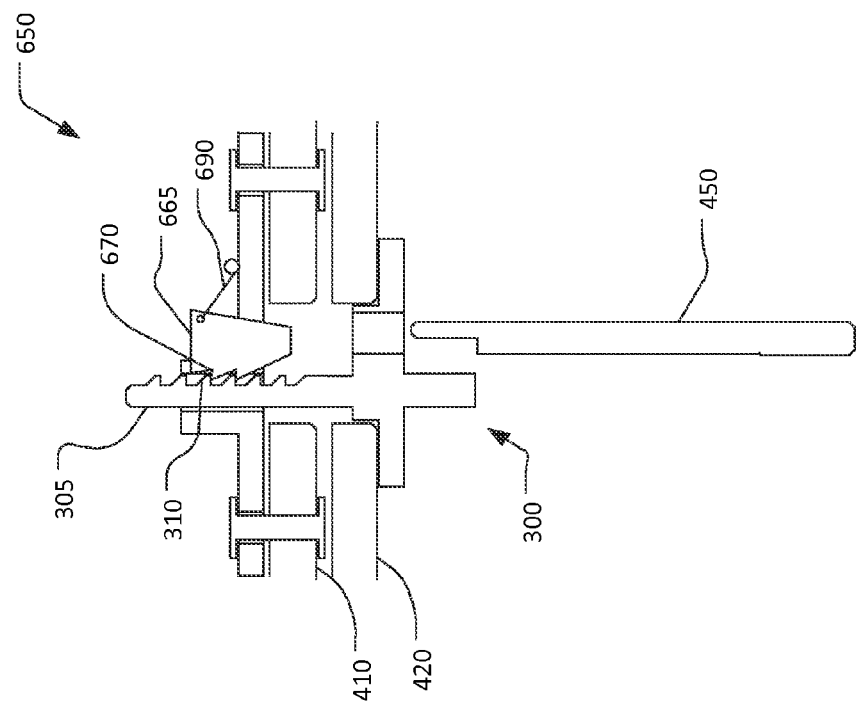
FIG. 6 is a cross-sectional view showing the pin of FIG. 3A engaged with another receptacle.

FIG. 6 is a cross-section view (with section lines omitted) of the pin 300 engaged with another receptacle 650 to fasten first and second panels 410, 400. The receptacle 650 may be similar to the receptacle 350 of FIGS. 3B and 4, except that the receptacle 650 may include a retainer 665 in the form of a toothed wedge-shaped pawl. The one or more teeth 670 of the retainer 665 may engage a comparable number of teeth 310 on the shank 305 of the pin 300. The wedge shape of the retainer 665 may be configured such that a force applied to withdraw the pin 300 will cause the teeth 670 of the retainer 665 to engage more fully with the teeth 310 of the pin 300. A spring 690 may keep the retainer 665 in the proper position to engage of the pin, and may prevent detachment during vibration. A key 450 may be configured to disengage the retainer 665 to allow the pin 300 to be withdrawn.

A number of variations on the panel fasteners are possible but not shown in the figures. For example, the end of the shank of the connector pins may be pointed to facilitate alignment of the panels being fastened. The keyhole in the head of a pin and the cross-section of the key may shaped to allow insertion in one orientation only. Similarly, the cross section of the shank of a pin and the aperture of a receptacle may be shaped to allow insertion of the pin in one orientation only. A single pawl may be used as shown in FIGS. 3B and 6. Alternatively, teeth provided on multiple surfaces of a pin may engage multiple pawls to increase strength. A connector pin may be coupled to a second panel by a retainer that prevents complete detachment of the connector pin. Similarly, a key may be coupled to, or built into, a connector pin. The receiving end of the aperture of a receptacle may be beveled to facilitate alignment. The keyhole in a pin and/or a receptacle may be rounded to minimize friction on the key. If the depth of the retainer behind the second panel is known and fixed, the key length may be set to just engage the top of the retainer.

Description of Processes

Figure 7:
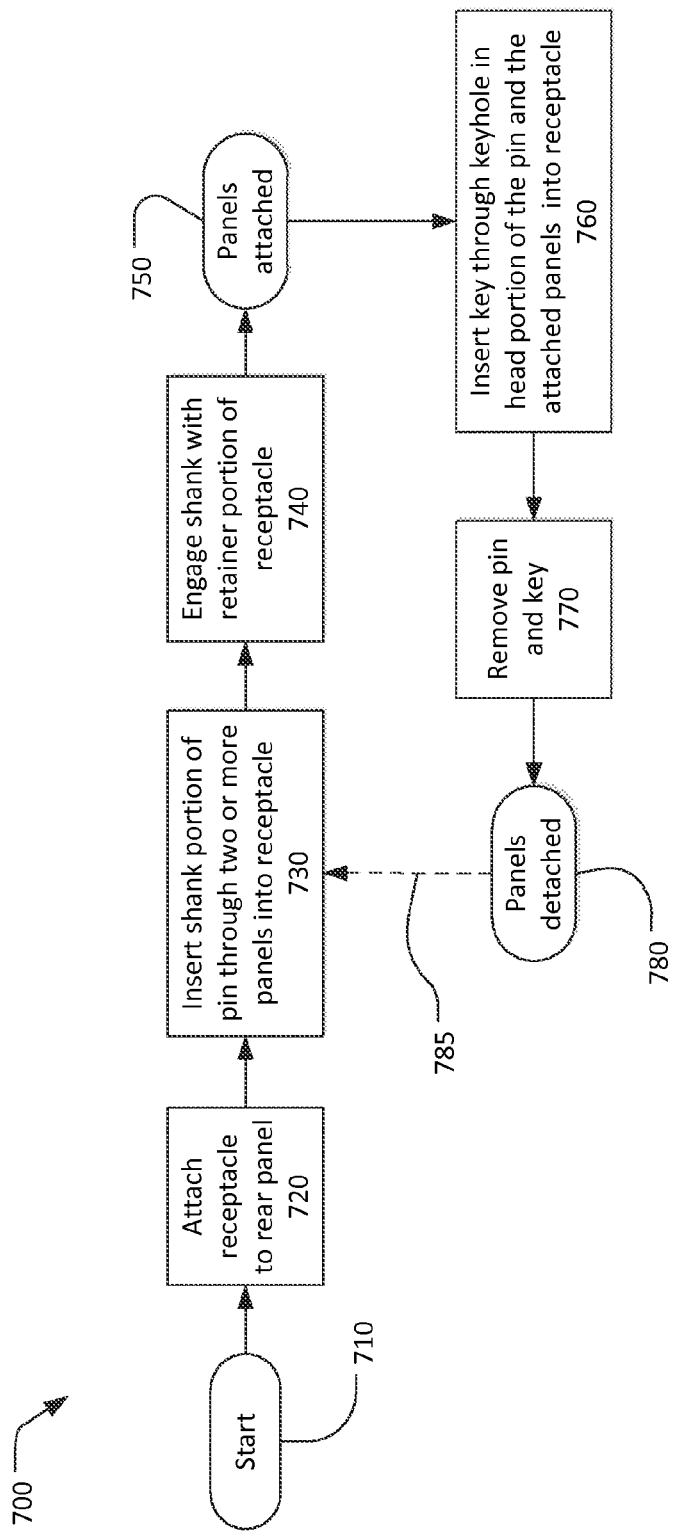
FIG. 7 is a flow chart of a process for attaching and detaching multiple panels.

Referring now to FIG. 7, a process 700 for attaching and detaching multiple panels may start at 710 and may end at 750 with the panels attached or at 780 with the panels detached.

The process 700 may be cyclical, with the panels attached and detached multiple times, as indicated by the dashed arrow 785.

Prior to the start 710 of the process 700, two or more panels to be attached and the components of a panel fastener may have been fabricated. The panel fastener may include a headed pin (such as the pins 100 and 300), a receptacle (such as the receptacles 150, 350, 550, and 650), and a key (such as the keys 250 and 450) configured to allow the headed pin to be removed from the receptacle.

At 720, the receptacle may be fastened to the rear side of a rear panel to be attached. In this context, the terms "front" and "rear" are from the perspective of a worker performing the process 700. The rear surface of the rear panel is the panel surface that will be furthest from the worker when the multiple panels have been attached using the process 700. The receptacle may be attached to the rear panel using rivets, screws, spot welds, adhesive bonding, or some other method. Attaching the receptacle to the rear surface of the rear panel is not necessarily required if the worker has access to the rear surface during the process 700.

At 730, a shank portion of the headed pin may be inserted through the two or more panels to be attached into an aperture of the receptacle. Each of the panels to be attached may include a hole to receive the shank of the pin. These holes may be aligned roughly concentrically prior to inserting the shank portion of the pin.

At 740, the shank portion of the pin may engage with a retainer portion of the receptacle. For example, a spring metal retainer may engage a softer flat surface of the shank, as shown in FIG. 2A. One or more teeth on the retainer may engage one or more teeth on the shank, as shown in FIGS. 4, 5, and 6. The shank portion may engage the retainer in some other manner. Although shown as a separate action for ease of discussion, the engagement of the shank and the retainer at 740 may be a direct consequence of inserting the shank into the receptacle at 730, such that actions at 730 and 740 are concurrent. The process 700 may then end at 750 with the panels attached by the panel fastener.

Attached panels may be separated by first inserting a key through a keyhole in the head portion of the pin at 760. The key may pass through the head and the attached panels into the receptacle. The key may be configured to cause the retainer in the receptacle to disengage from the shank of the pin, allowing the pin, and subsequently the key, to be withdrawn at 770. The process 700 may then end at 780 with the panels detached. The process 700 may be repeated from 730 to attach and detach the panels as needed.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A panel fastener, comprising:
    a pin comprising a head and a shank extending from the head; and
    a receptacle comprising an aperture to receive the shank and a retainer configured to engage the shank to prevent the shank from being withdrawn from the aperture,
    the head and the receptacle having respective openings to receive a key having a stem configured to pass through the openings in the head and the receptacle to disengage the retainer from the shank, wherein
    the stem has an irregular cross-sectional shape, and
    the opening in the receptacle has an corresponding irregular shape.

2. The panel fastener of claim 1, wherein the opening in the head and the opening in the receptacle are configured to allow the key to be inserted into the receptacle generally parallel to the shank.

3. The panel fastener of claim 1, the receptacle further comprising:
    an abutment configured to prevent the shank from bending away from the retainer.

4. A panel fastener, comprising:
    a pin comprising a head and a shank extending from the head; and
    a receptacle comprising an aperture to receive the shank and a retainer configured to engage the shank to prevent the shank from being withdrawn from the aperture,
    the head and the receptacle having respective openings to receive a key to disengage the retainer from the shank, wherein
    the shank is serrated, and
    the retainer comprises a spring-loaded pivoting pawl configured to engage one or more serrations on the shank.

5. The panel fastener of claim 4, wherein the opening in the head and the opening in the receptacle are configured to allow the key to be inserted into the receptacle generally parallel to the shank.

6. The panel fastener of claim 4, the receptacle further comprising:
    an abutment configured to prevent the shank from bending away from the retainer.

7. A panel fastener, comprising:
    a pin comprising a head and a shank extending from the head; and
    a receptacle comprising an aperture to receive the shank and a retainer configured to engage the shank to prevent the shank from being withdrawn from the aperture,
    the head and the receptacle having respective openings to receive a key to disengage the retainer from the shank, wherein the retainer is a flat spring disposed such that an edge of the flat spring engages a face of the shank at an oblique angle.

8. The panel fastener of claim 7, wherein the face of the shank engaged by the retainer is serrated.

9. The panel fastener of claim 7, wherein the face of the shank engaged by the retainer is not serrated.

10. The panel fastener of claim 9, wherein the flat spring is configured to engage the face of the shank with sufficient force to elastically deform the face of the shank.

11. The panel fastener of claim 9, wherein the flat spring is formed of a spring material, and the face of the shank engaged by the retainer comprises a material softer than the spring material.

12. The panel fastener of claim 7, wherein the opening in the head and the opening in the receptacle are configured to allow the key to be inserted into the receptacle generally parallel to the shank.

13. The panel fastener of claim 7, the receptacle further comprising:
an abutment configured to prevent the shank from bending away from the retainer.

14. A panel fastener, comprising:
a pin comprising a head and a shank extending from the head;
a receptacle comprising an aperture to receive the shank and a retainer configured to engage the shank to prevent the shank from being withdrawn from the aperture, the head and the receptacle having respective openings to receive a key to disengage the retainer from the shank; and
an ejector spring configured to push the pin away from the receptacle.

15. The panel fastener of claim 14, wherein the ejector spring is one of a coil spring and a spring washer affixed to the head concentric with the shank.

16. The panel fastener of claim 14, wherein the opening in the head and the opening in the receptacle are configured to allow the key to be inserted into the receptacle generally parallel to the shank.

17. The panel fastener of claim 14, the receptacle further comprising:
an abutment configured to prevent the shank from bending away from the retainer.

* * * * *